(12) United States Patent
Cahill

(10) Patent No.: US 9,037,371 B2
(45) Date of Patent: May 19, 2015

(54) SYSTEMS AND METHODS FOR MANUAL BRAKING SYSTEM

(75) Inventor: Eric D. Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 112 days.

(21) Appl. No.: 13/225,272

(22) Filed: Sep. 2, 2011

(65) Prior Publication Data
US 2013/0060438 A1    Mar. 7, 2013

(51) Int. Cl.
| | |
|---|---|
| G06F 19/00 | (2011.01) |
| B60T 7/04 | (2006.01) |
| B60T 7/08 | (2006.01) |
| B60T 8/17 | (2006.01) |
| B60T 8/88 | (2006.01) |
| B60T 17/22 | (2006.01) |
| B64C 25/44 | (2006.01) |

(52) U.S. Cl.
CPC ................ *B60T 7/042* (2013.01); *B60T 7/085* (2013.01); *B60T 8/1703* (2013.01); *B60T 8/885* (2013.01); *B60T 17/221* (2013.01); *B64C 25/44* (2013.01); *B60T 2270/404* (2013.01); *B60T 2270/413* (2013.01)

(58) Field of Classification Search
CPC ......... B60T 7/08; B60T 8/1755; B60T 8/172; B60T 7/22; G06F 19/00; F16D 65/34; B60W 10/18; B60W 10/184
USPC .................... 701/3, 13, 70; 188/158
See application file for complete search history.

(56) References Cited

U.S. PATENT DOCUMENTS

| | | | | |
|---|---|---|---|---|
| 2,717,745 | A | * | 9/1955 | Carter ........................... 244/111 |
| 3,913,418 | A | * | 10/1975 | Miyao et al. .................... 60/431 |
| 3,934,125 | A | * | 1/1976 | Macano ........................... 701/20 |
| 4,699,239 | A | * | 10/1987 | Ishino et al. ................... 180/315 |
| 5,024,491 | A | * | 6/1991 | Pease et al. ................... 303/195 |
| 6,183,051 | B1 | * | 2/2001 | Hill et al. ...................... 303/126 |
| 7,128,376 | B2 | * | 10/2006 | Williams et al. ................ 303/15 |
| 8,696,072 | B2 | * | 4/2014 | Oyama et al. .............. 303/117.1 |
| 2004/0168539 | A1 | * | 9/2004 | Rosencrantz ................... 74/543 |
| 2010/0254058 | A1 | * | 10/2010 | Kirchbaum et al. .......... 361/103 |
| 2010/0274458 | A1 | * | 10/2010 | Cahill et al. .................... 701/76 |
| 2011/0018337 | A1 | * | 1/2011 | King et al. ....................... 303/13 |
| 2011/0204978 | A1 | * | 8/2011 | Jansson ......................... 330/253 |
| 2012/0081234 | A1 | * | 4/2012 | Shaffer et al. ................. 340/905 |
| 2013/0006447 | A1 | * | 1/2013 | Thibault et al. ................... 701/3 |

* cited by examiner

*Primary Examiner* — Tuan C. To
*Assistant Examiner* — Shardul Patel
(74) *Attorney, Agent, or Firm* — Snell & Wilmer L.L.P.

(57) ABSTRACT

Systems and methods disclosed herein may be useful for manual braking systems for use in, for example, an aircraft. A system is disclosed that allows for manual braking. For example, a system is provided comprising a brake handle, a potentiometer in mechanical communication with the brake handle, a mapping module in electrical communication with the potentiometer, wherein the mapping module receives an output voltage from the potentiometer, wherein the mapping module produces a braking command output.

7 Claims, 3 Drawing Sheets

300

Displacement (Address) to Pressure (Output) Curve 302  304 306

US 9,037,371 B2

SYSTEMS AND METHODS FOR MANUAL BRAKING SYSTEM

FIELD

The present disclosure is related to systems and methods for a manual braking systems for use in, for example, an aircraft.

BACKGROUND

Aircraft often include a manual braking system that enables brake actuation in the event the primary braking systems fail (e.g., in an emergency situation) or during other suitable times, such as while parked on the ground. For example, such systems may include a handbrake that a pilot would operate manually in the event the primary braking system fails. Such systems typically connect the handbrake to a cable that runs from the cockpit to a one or more brake system components. The mechanical action of the cable is then used to mechanically actuate a valve that provides braking. However, the cable has many disadvantages, such as weight. In addition, assembling the aircraft is made more difficult by the introduction of the cable and its mechanical calibration. For example, over time and depending on environmental conditions, the cable may change in size, tensile strength, or other physical property, and thus degrade performance. Thus, there is a need for manual braking systems that overcome these disadvantages.

SUMMARY

Systems and methods disclosed herein may be useful in manual braking systems. In this regard, in various embodiments, a system is provided comprising a brake handle, a potentiometer in mechanical communication with the brake handle, and a mapping module in electrical communication with the potentiometer, wherein the mapping module receives an output voltage from the potentiometer, and wherein the mapping module produces a braking command output.

In various embodiments, a method is provided comprising receiving an input voltage from a potentiometer, converting the input voltage to a digital representation, and mapping the digital representation to a predetermined braking command.

In various embodiments, a computer readable medium is provided bearing instructions for manual braking, the instructions, when executed by a processor, cause said processor to perform operations comprising receiving an input voltage from a potentiometer, converting the input voltage to a digital representation, and mapping the digital representation to a predetermined braking command.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
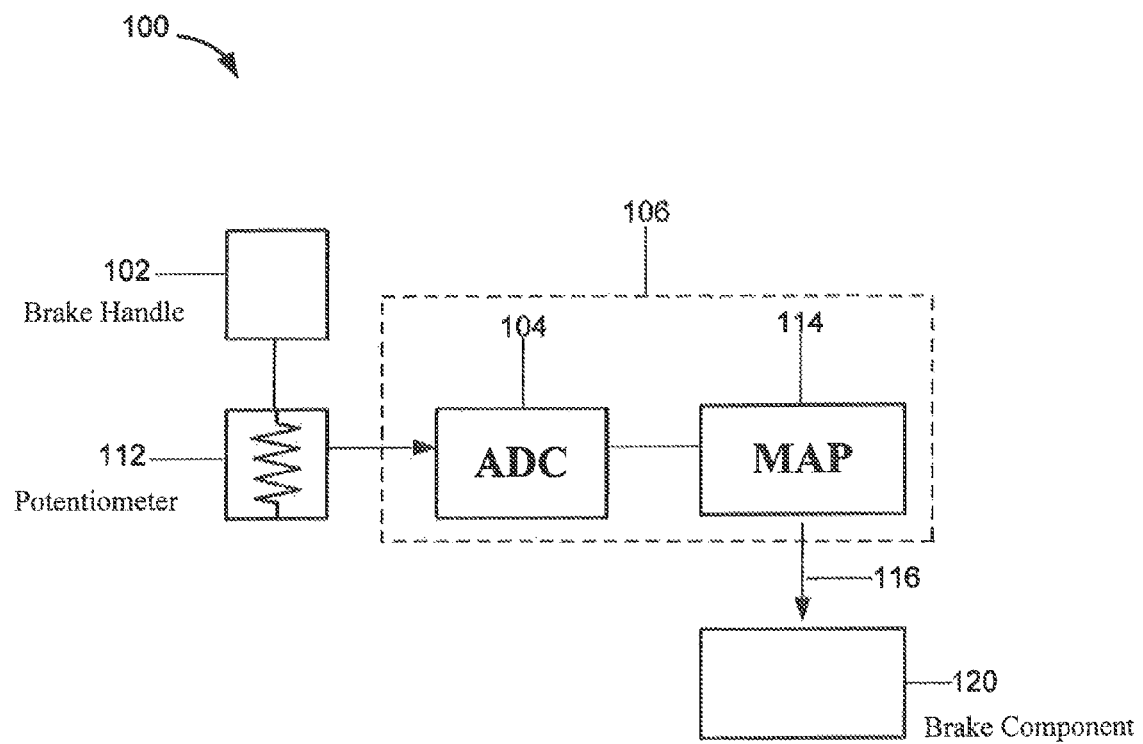
FIG. 1 illustrates a manual braking system in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for manual braking systems. Although the embodiments herein are described with reference to manual braking systems used in connection with aircraft, such embodiments are provided for example only as it is contemplated that the disclosures herein have applicability to other vehicles, such as for example, automobiles.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake disk stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position) fluid pressure is permitted to pass through the valve. While in a second position (e.g., a disarmed position), fluid pressure is prevented from passing through the valve. During normal braking, the SOV is in the armed position, thereby permitting the flow of fluid pressure. The BSV, based on braking commands from the pilot (often via an electronic controller that may implement, for example, anti-skid logic), controls the amount of fluid pressure provided to the actuator ram, and thus, the braking force applied to the wheel. To prevent unintentional braking (e.g., due to a faulty servo valve) at various times, the SOV is set in the disarmed position, thereby removing fluid pressure from the BSV. Since the BSV does not receive fluid pressure, it cannot provide fluid pressure to the actuator ram, and thus, braking cannot be effected.

In electronic brakes, a brake controller is coupled to one or more electromechanical actuator controllers ("EMAC") for brakes which drives one or more electromechanical brake actuators. The brake controller may be in communication with a brake pedal, and thus, may control the EMAC in accordance with pilot/copilot braking commands.

Aircraft braking systems typically receive braking commands (e.g. from a pilot or copilot) via pedals that are conventionally operated with a foot or feet. The amount of pedal deflection typically corresponds to the amount of braking force desired or, in some aircraft, pedal deflection varies in accordance with desired deceleration. A manual braking system may supplement or parallel an aircraft braking system. A manual braking system may allow one to manually operate a braking system. This may occur in an emergency scenario where one or more brake pedals have ceased to function, though a manual braking system may be used in non-emergency contexts, such as while an aircraft is parked on the ground. While referred to as a manual braking system, it is contemplated that body parts other than a hand may operate the braking system, including the feet. Moreover, it is contemplated that a manual braking system may be operated by non-human operators.

An exemplary manual braking system 100 is illustrated in FIG. 1. Brake handle 102 may be any suitable brake handle. A brake handle may comprise a lever, stick, or other component that may be moveable. A brake handle may comprise a lever that is coupled to an axis about which the brake handle pivots or otherwise moves. For example, the axis may be a hinge or a joint.

Brake handle 102 may be in communication with potentiometer 112. Brake handle 102 may be in mechanical communication, electrical communication, or combinations thereof with potentiometer 112. Movement of brake handle 102 thus operates potentiometer 112. Brake handle 102 may have a home position that represents a starting position, such as at zero percent deflection. Brake handle 102 may also have a maximum deflection position, such as at one hundred percent deflection.

Potentiometer 112 may be any suitable potentiometer. Analog and digital potentiometers are contemplated herein. For example, a wiper of potentiometer 112 may be in mechanical communication with brake handle 102 such that movement of brake handle 102 causes movement of the wiper. Potentiometer 112 provides a voltage output that is variable in accordance with the movement of brake handle 112. Potentiometer 112 may be configured so that the range of voltage output is known. In various embodiments, potentiometer 112 outputs 0 V in response to a brake handle that is at a home position. Also in various embodiments, potentiometer 112 outputs 0 V in response to a brake handle that is below a minimum amount of deflection, for example, ten percent deflection. Such a feature may be helpful to prevent unintended braking when the brake handle is inadvertently moved to a small but nonzero deflection state.

Mapping module 106 comprises ADC 104 and mapper 114. The output voltage of potentiometer 112 may be sent to mapping module 106.

The output voltage of potentiometer 112 may be sent to ADC 104 of mapping module 106. ADC 104 is an analog to digital converter. ADC 104 may be any suitable analog to digital converter. ADC 104 receives the output voltage of potentiometer 112 and produces a digital representation of the output voltage of potentiometer 112. The digital representation may comprise a binary number corresponding to a particular output voltage of potentiometer 112, which in turn, corresponds to a particular deflection of brake handle 102.

The digital representation may be sent to mapper 114. Mapper 114 may comprise a mapping of a given expected digital representation input to a predetermined braking command. In such a manner, the digital representations of all or a portion of the range of potential voltage outputs of potentiometer 112 (representing all or a portion of the range of deflection for brake handle 102) may be stored in mapper 114. For each digital representation, a corresponding braking command may also be stored and/or linked to the digital representation.

For example, potentiometer 112 may output 10 mV in response to twenty percent deflection from brake handle 102. ADC 104 may convert 10 mV to a digital representation, such as a binary number (e.g., 10001110101). Mapper 114 may receive the digital representation (e.g., 10001110101) and map the digital representation to a braking command.

A braking command may comprise any command related to braking. A braking command may represent a digital output or an analog output. In various embodiments, a braking command comprises a digital output. A digital output may be sent to electric brake components (e.g., an electric brake controller or an EMAC). In various embodiments, a braking command may comprise a digital output that is transmitted to a digital to analog converter (DAC). A DAC receives a digital input and produces an analog output in accordance with the digital input. For example, a digital braking command may be sent to a DAC and converted to an analog output. The analog output may be referred to as an analog braking command.

Brake component 120 may be any component of a braking system. Brake component 120 may effect braking or otherwise be involved in effecting braking. Brake component 120 may be configured to receive an analog (e.g., voltage output) or a digital (e.g., binary information) braking command. A digital braking command may be sent to brake component 120, such as in embodiments where brake component 120 comprises electric brake components (e.g., an electric brake controller or an EMAC). In various embodiments, however, an analog braking command may be sent to one or more electric brake components (e.g., an electric brake controller or an EMAC). An analog braking command may be sent to brake component 120, such as in embodiments where brake component 120 comprises one or more components of a hydraulic braking system. For example, an analog braking command may be sent to an SOV, a BSV, or both. In particular, analog braking command may be sent to a solenoid valve of an SOV and/or a solenoid valve of BSV. As described above, SOV allows hydraulic pressure to be accessible by BSV. BSV provides hydraulic pressure to an actuator ram and thus effects braking. The SOV must be open for the BSV to effect braking, so the analog braking command may either open the BSV, open the BSV and SOV, or open the SOV and have another components open the BSV to effect braking. In various embodiments, however, a digital braking command may be sent to one or more components of a hydraulic braking system.

A braking command may be transmitted to brake component 120 in any suitable manner. A braking command may preferably be transmitted by one or more wires or a braking command may be transmitted wirelessly, though wireless transmission may be disfavored in the aircraft context. A braking command may also travel to or through one or more intermediary devices (amplifiers, relays, switches, etc) prior to arriving at brake component 120.

Figure 2:
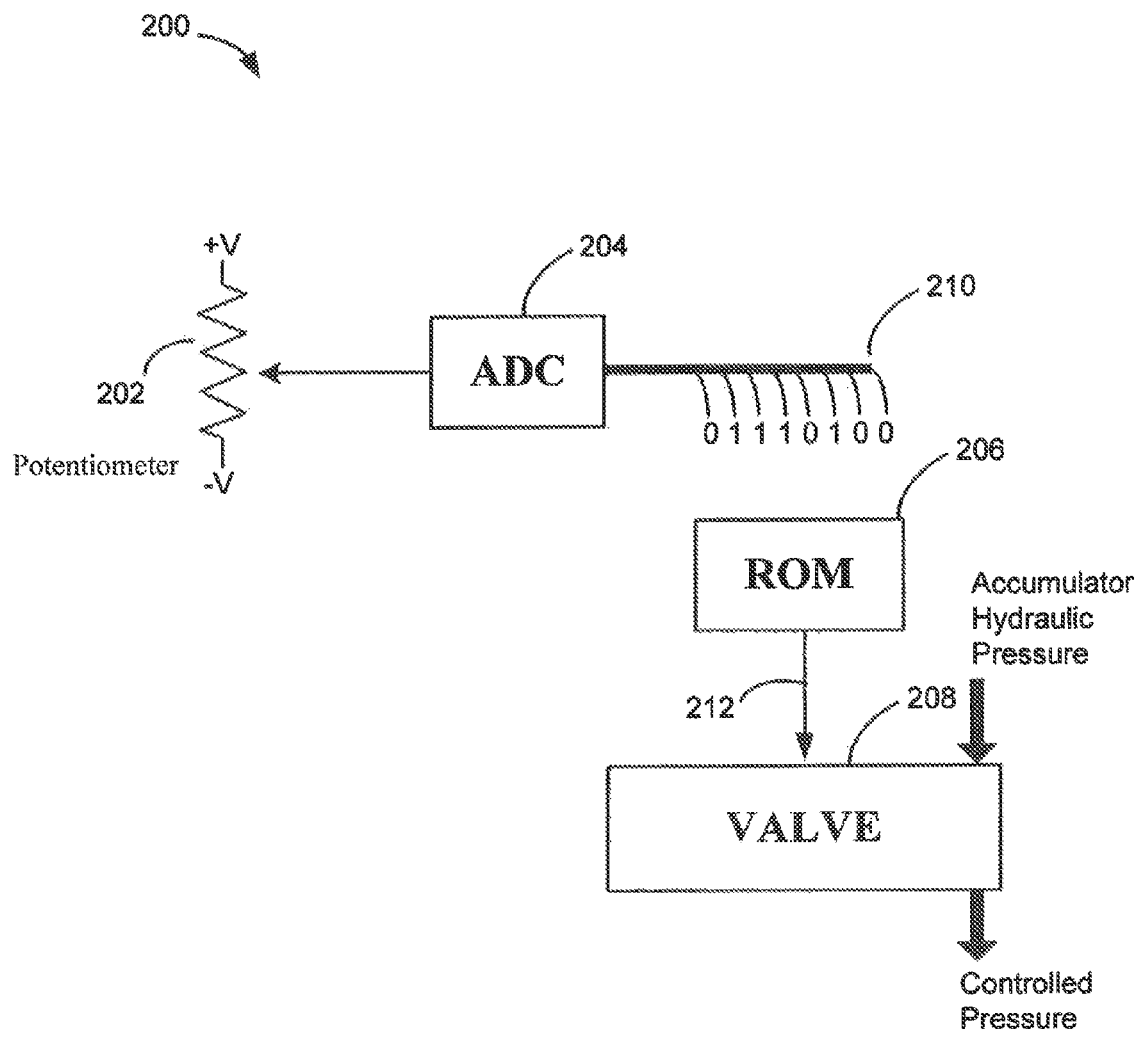
FIG. 2 illustrates a further manual braking system in accordance with various embodiments.

With reference to FIG. 2, manual braking system 200 is illustrated with reference to hydraulic brakes. Potentiometer 102 is in communication with a brake handle. Potentiometer 102 thus produces a variable voltage output in accordance with the amount of brake handle deflection. The variable voltage output of potentiometer 102 is transmitted to a mapping module comprising ADC 104 and ROM 106. ADC 104 receives the variable voltage output of potentiometer 102 and converts the variable voltage output to digital representation 110 (e.g., a binary number). Digital representation 110 is transmitted to ROM 106. ROM module 106 comprises a mapper that maps digital representation 110 to a braking command. ROM module 106 also comprises a DAC that converts the braking command to analog braking command 212. Analog braking command 212 is transmitted to valve 108. Valve 108 receives hydraulic pressure and, in response to analog braking command 212, applies controlled pressure to a brake actuator.

A mapper may map a digital representation to any number of braking commands. A set of mapped digital representation to braking commands may be referred to as a braking response profile. In various embodiments, a braking response profile may comprise one or more relationships between a digital representation and a braking command. Each relationship may be linear, exponential, or other relationship.

Figure 3:
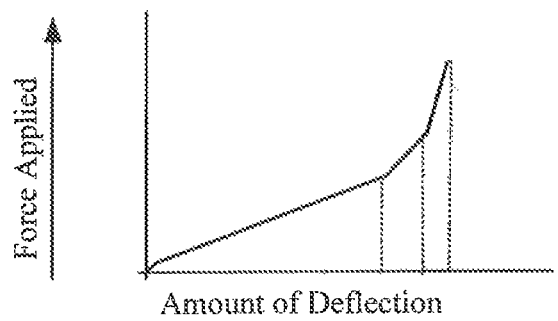
FIG. 3 illustrates a braking response profile in accordance with various embodiments.
Figure 3:
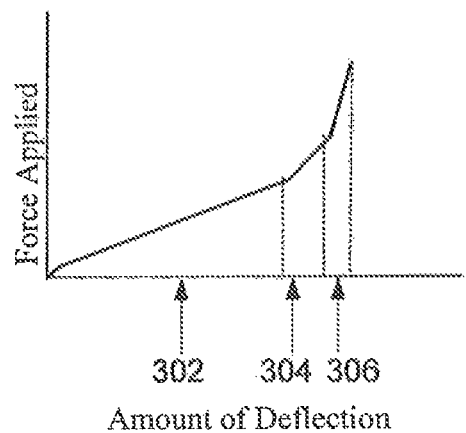

An exemplary braking response profile 300 is shown in FIG. 3. The y axis denotes force applied at the brake or, in various embodiments, the commanded deceleration. The x axis denotes the amount of brake handle deflection. As shown, at low levels of brake handle deflection, a first linear relationship between brake handle deflection and brake force is used (shown in space 302). As brake handle deflection increases, a second linear relationship between brake handle deflection and brake force is used (shown in space 304). As brake handle deflection increases and approaches maximum deflection, a third linear relationship between brake handle deflection and brake force is used (shown in space 306). Other suitable braking response profiles are contemplated herein, for example, those using two linear relationships, one or more non-linear relationships, and a combination of linear relationships and non-linear relationships.

In various embodiments, an aircraft may comprise a brake handle for each wheel or set of wheels. For example, an aircraft may comprise a brake handle for the left wheels and a brake handle for the right. In such a manner, the aircraft may be steered using selective application of the brakes.

Also in various embodiments, two brake handles corresponding to two potentiometers may be employed. For example, one brake handle/potentiometer may be positioned near a pilot and another brake handle/potentiometer may be positioned near the copilot. The output of the two brake handle/potentiometers may be compared (for example, using a comparator) prior to being transmitted to the ADC. The greater of the two voltages may be forwarded to the ADC. In this manner, for example, the copilot may effect greater braking force in the event the pilot is incapacitated. In like manner, the output of the two brake handle/potentiometers may both be converted to digital representations in one or more ADCs, and then compared using a digital comparator or other suitable device.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

As used herein, the meaning of the term "non-transitory computer-readable medium" should be construed to exclude only those types of transitory computer-readable media which were found in *In re Nuijten,* 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising: a first manual brake handle; an electromechanical brake controller ("EMAC"); a first potentiometer in mechanical communication with the first manual brake handle; a second manual brake handle in mechanical communication with a second potentiometer; a comparator that receives a first output voltage from the first potentiometer and a second output voltage from the second potentiometer; a mapping module in electrical communication with the comparator, wherein the mapping module receives an output from the comparator comprising the greater of the first output voltage and the second output voltage, wherein the mapping module produces a braking command output, wherein the EMAC receives the braking command output, wherein the mapping module comprises an analog to digital converter ("ADC"), wherein the ADC creates a digital representation of the output from the comparator wherein the mapping module further comprises a mapper, and wherein the mapper maps the digital representation of the output from the comparator to a predetermined braking command.

2. The system of claim 1, wherein the digital representation is a binary number.

3. The system of claim 1, wherein the braking command output comprises the predetermined braking command.

4. The system of claim 3, wherein the braking command output comprises a digital output.

5. The system of claim 1, wherein the mapping module further comprises a safety module.

6. The system of claim 5, wherein the safety module receives aircraft status information and determines whether braking is appropriate based upon the aircraft status information.

7. A system comprising: a first manual brake handle; a brake component comprising at least one of a brake servo valve ("BSV") and a shutoff valve ("SOV"); a first potentiometer in mechanical communication with the first manual brake handle; a second manual brake handle in mechanical communication with a second potentiometer; a comparator that receives a first output voltage from the first potentiometer and a second output voltage from the second potentiometer; an analog to digital converter ("ADC") that receives the greater of the first output voltage and the second output voltage from the comparator; a mapping module that receives a digital output from the ADC, wherein the mapping module further comprises a mapper, wherein the mapper maps the digital representation of the output from the comparator to a predetermined braking command, wherein the mapping module produces a braking command output, and wherein the brake component receives the braking command output.

* * * * *